Aug. 20, 1968   P. A. KEITH   3,397,491
COTTON PICKER SPINDLE RECONDITIONING MACHINE
Filed Aug. 5, 1965
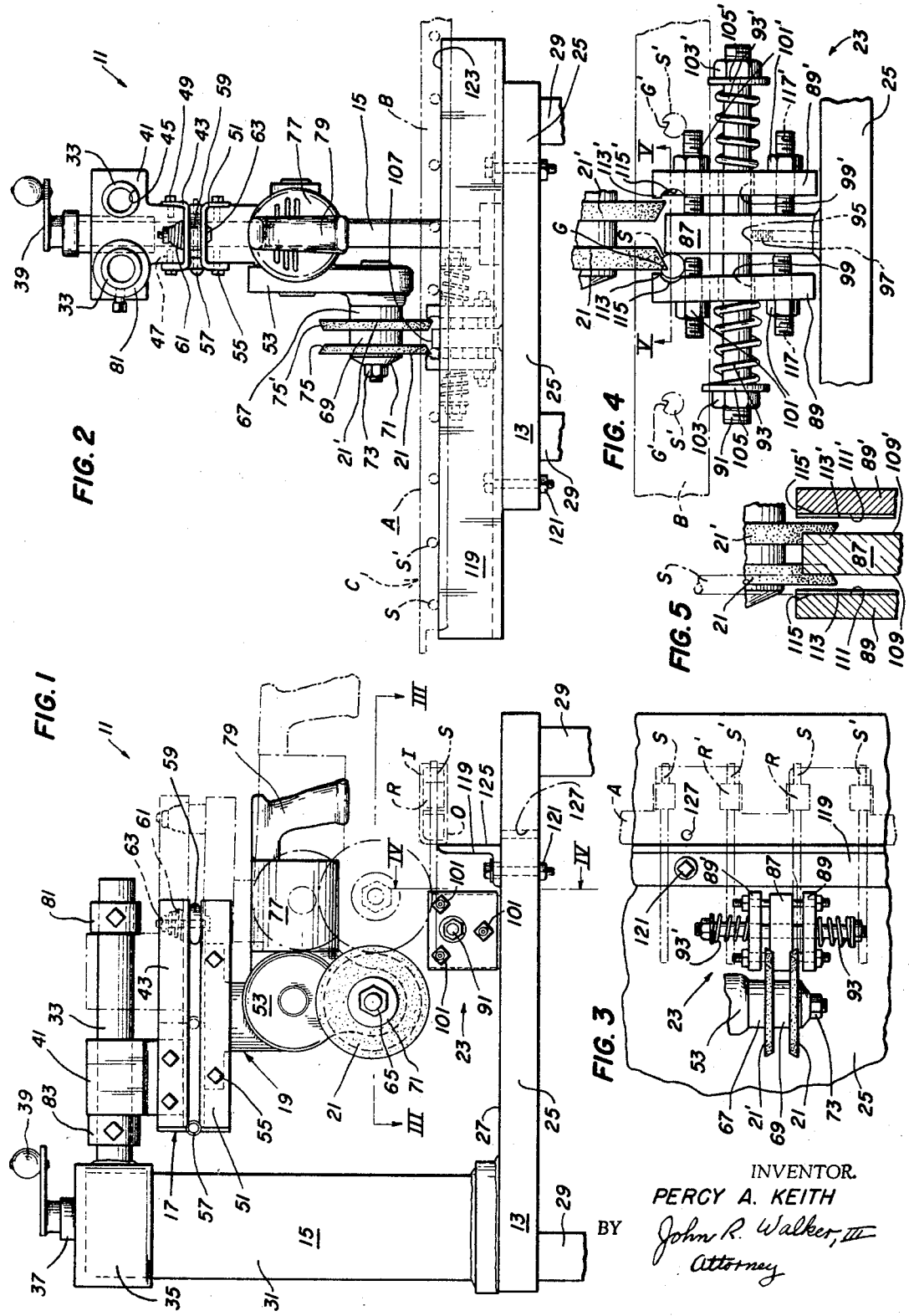
INVENTOR.
PERCY A. KEITH
BY John R. Walker, III
Attorney

United States Patent Office 3,397,491
Patented Aug. 20, 1968

3,397,491
COTTON PICKER SPINDLE RECONDITIONING
MACHINE
Percy A. Keith, 1322 E. 2nd, Pine Bluff, Ark. 71601
Filed Aug. 5, 1965, Ser. No. 477,364
9 Claims. (Cl. 51—34)

ABSTRACT OF THE DISCLOSURE

A reconditioning machine for grinding or sharpening cotton-picking spindles. The machine is provided with a clamp mechanism for removably holding a pair of Rust-type cotton-picker spindles, preferably while they are still in the slats. A pair of rotatably driven grinding wheels are mounted from a carriage which is pivotally mounted from another carriage that in turn is rectilinearly movable along track structure so that the grinding wheels can be moved into engagement with the spindles and therealong for grinding grooves longitudinally and simultaneously in both of the spindles. The pivoting of one carriage relative to the other permits limited vertical movement of the grinding wheels as the carriage is moved along the track structure so that the machine is particularly useful in grinding bent spindles since in grinding a groove of uniform depth in a bent spindle the grinding wheel must follow a slightly curved path.

---

This invention relates to mechanical cotton pickers generally and particularly relates to a cotton picker spindle reconditioning machine for grinding or sharpening cotton picker spindles. Further, the invention is particular directed toward the so-called Rust cotton picker and for sharpening or reconditioning the spindles of these cotton pickers.

The spindles of the Rust type machine are rod-like and each has a V-groove extending longitudinally along the cotton-engaging portion thereof. The V-groove is so arranged that one wall surface of the two wall surfaces defining the groove is undercut somewhat relative to the cylindrical outer-surface of the spindle and so provides a sharp edge. The sharpened edge along the spindle causes the cotton fiber of the cotton plant to catch on the spindle and causes the spindle to readily wrap the cotton. Additionally, some grooved spindles are provided with diagonally cut recesses intersecting the undercut wall of the V-groove of the spindle and provides a longitudinallly extending row of sharp pointed barbs along the spindle groove.

In a Rust cotton harvester the spindles are carried in an endless oval path by an endless series of vertically extending slat members. Each slat member in turn carries a plurality of spindles. The spindles are each rotatably mounted in the slat member and disposed in a vertically extending row of spindles. Adjacent two spindles of the row of spindles in a slat turn in opposite directions; the alternate spindles of the row of spindles turn in the same direction.

There are two kinds of cotton picking spindles including a right hand spindle for clockwise rotation and a left hand spindle for counterclockwise rotation. The two kinds of spindles differ mainly in the V-grooves respectively in the spindles. In a right hand spindle one of the wall surfaces defining the groove is undercut, and in the left hand spindle the other of the wall surfaces is undercut. Sharpened edges (or a row of pointed barbs) are thus provided along one side or the other side of the walls defining the V-groove of a spindle, depending on the rotation of the spindle. Typically, only one groove (or row of barbs) is provided longitudinally along a spindle and the spindle is either a left hand or a right hand spindle. However, a single spindle may be provided with two grooves (or two rows of barbs). Such a spindle is for bi-directional rotation and can be used as either a right hand or a left hand spindle and for clockwise or counterclockwise rotation in picking the cotton fiber.

Heretofore, in sharpening or reconditioning Rust spindles the practice has been to remove the spindle mounting slats from the picker, disassamble each slat and remove the individual spindles from the slat, and then sharpen each spindle separately. This was slow work. Removing the slats from the cotton picker was relatively easy, but disassemblying each slat and removing the spindles from the slat, sharpening or grinding the spindles, and then reassemblying the slats took considerable time and effort.

A principal object of the present invention is to provide a machine for sharpening or reconditioning the spindles as they are mounted in the slat and without disassemblying the slat to remove the spindles.

A further object is to provide a spindle reconditioning machine for consecutively uniformly sharpening or dressing each slat-mounted spindle accurately.

A further object is to provide a machine easy to operate, and such a machine requiring only negligible practice or skill to operate proficiently.

A further object is to provide a machine for economically reconditioning Rust spindles.

A further object is to provide a machine operable for reconditioning both right hand clockwise-picking spindles or left hand counterclockwise-picking spindles.

A further object is to provide a machine optionally operable for either reconditioning slat-mounted spindles or for reconditioning each spindle separately when removed from the slat.

The means by which the foregoing and other objects of the present invention are accomplished and the manner of their accomplishment may be readily understood upon reference to the accompanying drawings in which:

FIG. 1 is a side view of the spindle reconditioning machine of the present invention with the spindle mounted slat member illustrated in broken lines, and with certain parts of the machine illustrated in another position in broken lines.

FIG. 2 is a front view of the machine taken as from the right of FIG. 1.

FIG. 3 is a sectionalized fragmentarily illustrated top view taken as on the line III—III of FIG. 1.

FIG. 4 is an enlarged fragmentarily shown front view of the spindle clamping part of the machine.

FIG. 5 is a sectionalized fragmentarily illustrated view taken as on the line V—V of FIG. 4.

In the drawings, the various parts are indicated by reference characters. The spindle reconditioning machine is indicated generally by numeral 11 and includes primarily a base 13, upstanding support structure indicated by numeral 15, a first carriage 17, a second carriage 19, a pair of grinding wheels indicated respectively 21, 21' and spindle clamping means indicated generally by numeral 23.

The spindle mounting slat indicated by letter A is of typical Rust design and includes a somewhat rectangular narrow flat body B having an outer side portion indicated by the letter O and an inward side portion indicated by the letter I. A row of spindles S, S' are rotatably mounted in body B and project uniformly from the outer side portion O of slat body B. Spindles S, S' are respectively provided with V-grooves G, G', and respectively are right hand and left hand spindles. Right hand spindle S having grooves G are driven in a clockwise direction when picking cotton; left hand spindle S' having grooves G' are driven in a counterclockwise direction when picking cotton. Rollers R, R' fixedly secured on the inward end portions respectively of spindles S, S' roll along stationary rubber tracks (not illustrated) of the cotton harvesting machine and rotate the spindles.

Base 13 of machine 11 includes a substantially rectangular top structure 25 having a flat upper surface 27. A plurality of legs 29 (fragmentarily shown) elevationally support top structure 25. Base 13 is preferably constructed or fabricated of metal angles and plate material.

Support structure 15 includes a post member 31 and a pair of horizontally extending track members 33. A collar member 35 is slidably fitted over post 31, and is vertically positionable along the top portion of the post by a crank and screw mechanism indicated generally by numeral 37. Manually turning crank lever 39 vertically positions collar 35 along post member 31. The end portions respectively of a pair of tubular track members 33 are abuttingly and fixedly secured to collar 35 and track members 33 extend parallel. First carriage 17 includes a bracket 41 and a channel member 43. Bracket 41 is provided with a pair of parallel apertures 45 extending respectively through the upper portion of bracket 41 and two pairs of threaded apertures 47 oppositely arranged and disposed respectively in the lower portion of bracket 41. Cap screws 49, extending respectively through apertures provided in channel member 43 threadly engage threaded apertures 47 of bracket 41 and fixedly secure the bracket and channel member in substantially right angular configuration.

Second carriage 19 includes a channel member 51, a housing 53 and threaded fasteners 55 securing the channel member and housing together. A butt-type hinge member 57 pivotally secures first and second carriages 17 and 19 together with the respective flange portions of channel members 43, 51 extending oppositely. Hinge member 57 is fixedly secured respectively at the rearward end portions of channel members 43, 51. Second carriage 19 is subjacently disposed of first carriage 17 and is pivotally movable about a horizontal axis toward and away from the first carriage.

Contradirectionally operative means are provided for yieldably arresting the movement of second carriage 19 relative to first carriage 17. Such means includes a torus-shaped rubber cushion 59 and a compression spring 61. A threaded fastener 63 extending respectively through apertures provided in channel members 43, 51, through cushion 59 and spring 61, yieldably arrest the pivotable movement of carriage 19 relative to carriage 17. Cushion 59 disposed between the respective channel members yieldably arrests the upward movement of carriage 19; spring 61 disposed superjacently of channel member 43 yieldably arrests the downward pivotal movement of carriage 19.

Grinding wheels 21, 21' are rotatably mounted from housing 53. A shaft 65 having a shouldered portion 67 is journaled in housing 53 with the shouldered portion adjacent the housing. Grinding wheel 21', a spacer member 69, grinding wheel 21, and a washer 71, are secured on shaft 65 by nut 73. Grinding wheels 21, 21' are of like diameter and the outer peripheral portion of each wheel is beveled as indicated respectively by numerals 75, 75'. Wheels 21, 21' are positioned in such a manner that the bevels respectively of peripheral portions of 75, 75' extend oppositely or are opposingly arranged.

An electric motor 77, typically connected through switch means to a source of electric current is securely mounted from housing 53. A transmission or gear train enclosed in housing 53 typically provides drive train means for grinding wheels 21, 21'. A handgrip handle member 79 is fixedly secured to motor 77 and provides actuating means for moving carriages 17, 19 and grinding wheels 21, 21' rectilinearly forwardly or rearwardly. In FIG. 1 the forward position is indicated in broken lines and the rearward position is indicated in solid lines.

In moving carriages 17, 19 forwardly or rearwardly with handle member 79, the interior cylindrical surfaces of apertures 45 of bracket 41 slidably engage respectively the horizontally extending track members 33 of upstanding track support structure 15.

A forwardly disposed stop collar 81 and a rearwardly disposed stop collar 83 fitted respectively on one of horizontal track members 33 respectively limit the forward or rearward movement of carriages 17, 19 and grinding wheels 21, 21'.

Slat mounting and spindle clamping means are securely mounted on upper surface 27 of base top structure 25 for positioning and holding the slat and spindles. Spindle clamping means 23 includes basically a center jaw member 87, a first jaw member 89, a second jaw member 89', a support and guide rod 91, and coiled compression springs 93, 93'. Center jaw member 87 and first and second jaw members 89, 89' respectively are substantially square-profiled and preferably formed of metal plate material. Center jaw member 87 is somewhat thicker than first and second jaw members 89, 89' and is fixedly secured along the lower edge portion thereof to the upper surface 27 of base top structure 25. Support and guide rod 91 is symmetrically arranged and fixedly secured in center jaw aperture 95 by a set screw 97. First and second jaw members 89, 89' are provided respectively with apertures 99, 99' disposed in the central portion of the respective jaw members. Oppositely disposed end portions of support and guide rod 91 extend respectively through apertures 99, 99' of jaw members 89, 89' and support and guide the jaw members.

Three adjustable stop screw and nut assemblies 101 and three adjustable stop screw and nut assemblies 101' are threadedly fitted respectively through first and second jaw members 89, 89'. Each assembly of stop screw and nut assemblies 101 and 101' are substantially alike and respectively provide abutment means for limiting the inward movement of jaw member 89 and jaw member 89' toward center jaw member 87. The three assemblies 101 and the three assemblies 101' respectively are triangularly arranged and in such a manner that two assemblies of each three assemblies are disposed along the upper edge portion respectively of jaw members 89, 89' and are disposed in a substantially horizontally aligned disposition. Compression springs 93, 93' are respectively convolutely fitted on oppositely disposed end portions of support rod 81 and are secured respectively by nuts 103, 103' and washers 105, 105'.

Spindle clamp means 23 is adapted to clamp a right hand spindle S between first jaw member 89 and center jaw member 87 or to clamp a left hand spindle S' between second jaw member 89' and center jaw member 87, as best seen in FIG. 4. Center jaw member 87 includes a substantially flat horizontally extending upper surface 107 and oppositely disposed first and second spindle engaging surfaces 109, 109', as best seen in FIGS. 2 and 5. First and second jaw members 89, 89' respectively include spindle engaging surfaces 111, 111' opposingly arranged and respectively extending along the upper portions of jaw members 89, 89'. Rectilinear flanged portions 113, 113' respectively are provided along the upper portion of jaw members 89, 89' and project slightly from respective spindle engaging surfaces 111, 111'. Crescent-shaped recesses 115, 115' are provided respectively in jaw members 89, 89' at the forward edge portions respectively of surfaces 111, 111' and provide for easy entry respectively of spindles S, S' between the respective jaw members. With reference to FIG. 4 it will be noted that jaw member 89 is slightly canted vertically and is positioned thusly by spindle S illustrated as being clamped between jaw members 87, 89. It will be noted that the end surfaces respectively of the screw members of the upper two stop screw and nut assemblies 101 do not engage center jaw member 87 when spindle S is held in spindle clamp means 23. Conversely, as will be noted from FIG. 4, the end surfaces respectively of the screws of the upwardly disposed two screw and nut assemblies 101' do abutingly engage center jaw member 87 when a spindle S' is not being clamped between jaw members 89' and 87.

Hex-sockets 117, 117' provide respectively in the screws of screw and nut assemblies 101, 101' provide socket means for Allen type wrench means and for adjusting screw and nut assemblies 101, 101'. Screw and nut assemblies 101, 101' in addition to providing stop means for first and second jaw members 89, 89', also provide means for supporting and guiding respectively the spindles as they are being reconditioned. The inwardly disposed end portions respectively of the upper two screws of respective screw and nut assemblies 101, 101' engage respectively the under-cylindrical surfaces respectively of spindles S, S' as they are being abraded by wheels 21, 21'.

The slat mounting or supporting means of machine 11 is of substantially simple construction and includes basically an angle iron member 119 secured along top surface 27 of base structure 25 by threaded fasteners 121. The horizontally extending upper edge surface 123 (see FIG. 2) of angle iron member 119 is adapted to engage the cylindrical undersurface of each spindle of the row of spindles S, S' and to support slat A in a horizontal disposition. Angle member 119 is disposed in such a manner that face surface 125 thereof abutingly engages portion O of slat body B when a slat is being reconditioned.

Grinding wheels 21, 21' and clamp means 23 of machine 11 respectively provide cooperatively associated dual grinding wheels means and dual spindle clamping means. A right hand clockwise-picking spindle S is adapted to be clamped between jaw members 87, 89 and acted on by wheel 21; a left hand counterclockwise-picking spindle S' is adapted to be clamped between jaw members 87, 89' and to be acted on by wheel 21'.

Although not illustrated in the drawings, machine 11 is preferably typically provided with a diamond pointed grinding wheel dresser for dressing or shaping the beveled peripheral portions 75, 75' of wheels 21, 21'. Also not shown, although preferably included in machine 11, is means for dispensing liquid cooling or cutting oil. Machine 11 preferably includes a tank for containing the oil and suitable pump and conduit means for conveying the liquid to grinding wheels 21, 21' in a usual manner.

In using the machine the operator consecutively sharpens the spindles of slat A beginning with spindle S disposed in end portion C of the slat. Since the end spindle of slat portion C is a right hand spindle, the operator slidingly inserts this spindle in crescent shaped recess 115 and between jaw member slat engaging surfaces 109, and 111. After initially inserting spindle S in recess 115, the operator moves the slat and spindle away from him and until slat body portion O abutingly engages face surface 125 of angle member 119. By fingering roller R of spindle S, the operator rotates the spindle until groove G is disposed upwardly. With slat member A clamped thusly and with the spindle clamped in spindle clamping means 23, the operator grasps handle 79, moves the grinding wheels and carriages 17, 19 outwardly until bracket 41 abutingly engages forward stop collar 81 and thus sharpens the spindle. After spindle S has been sharpened, the carriage is moved rearwardly again to the starting position and with bracket 41 abutingly engaging stop collar 83.

After the end-disposed spindle S is sharpened, the operator then sharpens the next and adjacent spindle S'. The operator may do this by grasping slat body B, pulling the slat outwardly and removably retracting spindle S; and shifting the slat to the left and slidably inserting spindle S' by moving handle 79 forwardly and rearwardly in the above described manner of sharpening spindle S. The operator consecutively sharpens the remainder of the spindle disposed upwardly, the operator may then sharpen spindle S' by moving handle 79 forwardly and rearwardly in teh above manner of sharpening spindle S. The operator consecutively sharpens the remainder of the spindles in the slat in the same manner described as for sharpening the first two spindles.

When moving grinding wheels 21, 21' outwardly and sharpening respectively a spindle S or S', the operator may optionally move the wheels upwardly or downwardly by pressing upwardly or downwardly on handle member 79. Pressing downwardly on the handle causes the respective grinding wheel being used to increase the cutting action on the spindle being acted on or to cut a deeper groove in the spindle. Pressing upwardly on handle 79 slightly compresses cushion member 59 and reduces the cutting action of the respective grinding wheel on the spindle being acted on. Such means for varying the cutting action of a grinding wheel as it is being moved along a respectively spindle is particularly useful in grinding bent spindles and such spindles that in order to grind a groove of uniform depth the grinding wheel must follow a slightly curved path.

The grinding wheel cutting edges 75, 75' are kept in proper V-form by the diamond pointed grinding wheel dressing means (not shown). As the grinding wheels 21, 21' are repeatedly dressed, the wheels become smaller and it will be necessary to lower carriages 17, 19 and the wheels. This is done by turnably manipulating crank lever 39 disposed on post 31.

In certain instances it may be desirable to sharpen spindles which have been removed from the slat members. For such use, angle member 119 of the machine may be adjusted and moved outwardly to abutingly engage the annular face of a respective spindle roller R, R'. Additional apertures 127 are provided in base top structure 25 for receiving respectively threaded fasteners 121. When it is desirable to recondition spindles which have been removed from the slat members angle member 119 is moved forwardly and secured by fasteners 121 extending respectively through apertures 127.

A spindle having two grooves (or two rows of barbs) is not illustrated in the drawings. It is readily apparent, however, that such a bi-directional operative spindle may readily be reconditioned by first grinding the spindle with grinding wheel 21, and then grinding the spindle with grinding wheel 21'.

The spindle reconditioning machine of the present invention is versatile and may be used to recondition each spindle separately with the spindle removed from the spindle slat, or the spindles may be sharpened while mounted in the slat. The machine effectively reconditions either single-groove right hand or left hand spindles, or bi-directional two-groove spindles. The machine is effective for sharpening bent spindles. The groove-depth of each spindle sharpened is uniform throughout the length of the spindle and a plurality of spindles are sharpened uniformly. The machine requires only neglible skill or practice to use proficiently and its use results in considerable savings in labor and parts. The spindles may be sharpened expeditiously, thus resulting in less down-time for the cotton picking machine. In summary the machine of the present invention provides a very practical means for reconditioning cotton picker spindles.

Although the present invention has been described with reference to a preferred embodiment it is not to be so limited since changes and modifications may be made therein which are within the full intended scope of this invention as hereinafter claimed.

I claim:

1. A machine for reconditioning Rust type cotton picker spindles when said spindles are mounted in a cotton picker slat member, each said slat member having a plurality of longitudinally grooved clockwise-drivable right hand spindles and a plurality of longitudinally grooved counterclockwise-drivable left hand spindles alternatingly arranged in a row of spindles, the spindle reconditioning machine comprising base means including means for supporting a spindle mounting slat with the row of spindles disposed horizontal, dual clamp means for removably holding securely optionally either a right hand or a left hand spindle separately or simultaneously with the groove in said spindle disposed upwardly, said dual clamp means including first clamp means for removably holding a right hand spindle and second clamp means for removably holding a left hand spindle, an upstanding support member including horizontally extending track structure, carriage means supported from and rectilinearly movable along track structure, dual grinding wheels rotatably mounted from said carriage; said pair of grinding wheels being of like diameter, juxtaposedly arranged coaxially and fixedly secured together; said pair of grinding wheels including a first wheel for grinding a right hand spindle and a second wheel for grinding a left hand spindle simultaneously, if desired, motor means for driving said pair of grinding wheels and means for moving said pair of wheels rectilinearly and for moving respectively said first wheel and said second wheel simultaneously along a respective right hand and left hand spindle securely held respectively in said first and said second clamp means of said dual clamp means.

2. The cotton picker spindle reconditioning machine of claim 1 in which said dual clamp means includes a center jaw member fixedly mounted relative to said base means and having parallel and opposingly arranged spindle engaging surfaces including a first surface and a second surface; a first jaw member, a second jaw member, means supporting respectively said first jaw member and said second jaw member for movement respectively toward and away from said first and said second spindle engaging surfaces of said center jaw member, and spring means for yieldably urging respectively said first jaw member and said second jaw member toward said first and said second spindle engaging surfaces of said center jaw member.

3. The cotton picker spindle reconditioning machine of claim 2 in which said dual clamp means includes stop screw means for limiting respectively the inward movement of said first jaw member and said second jaw member toward said first spindle engaging surface and said second spindle engaging surface of said center jaw member.

4. The cotton picker spindle reconditioning machine of claim 3 in which said stop screw means in addition to providing means for limiting respectively the inward movement of said first jaw member and said second jaw member additionally provides means for supporting and guiding respectively a right hand or a left hand spindle securely clamped respectively between said center jaw and said first jaw member or between said center jaw member and said second jaw member.

5. The cotton picker spindle reconditioning machine of claim 1 in which said upstanding support member includes vertical adjustment means for regulating the vertical extension or elevation of said horizontally extending track structure and for regulating the elevation of said dual grinding wheel means relative to said dual clamp means.

6. The cotton picker reconditioning spindle machine of claim 1 in which said carriage means includes a first carriage, a second carriage subjacently disposed of said first carriage, means movably securing said second carriage from said first carriage with said second carriage being vertically movably toward or away from said first carriage, and contra-directionally operative means for yieldably arresting the movement of said second carriage toward or away from said first carriage.

7. A machine for reconditioning Rust type cotton picker spindles when said spindles are mounted in cotton picker slat members, each said slat member having a plurality of longitudinally grooved clockwise-drivable right hand spindles and a plurality of longitudinally grooved clockwise-drivable right hand spindles and a plurality of longitudinally grooved counterclockwise-drivable left hand spindles alternatingly arranged in a row of spindles, the spindle reconditioning machine comprising base means including means for supporting the spindle mounting slat with the row of spindles disposed horizontally, dual clamp means for removably holding securely optionally either a right hand or a left hand spindle with the groove of said spindle disposed upwardly, said dual clamp means including first clamp means for removably holding a right hand spindle and second clamp means for removably holding a left hand spindle, an upstanding support member including horizontally extending track structure, a first carriage supported from and rectilinearly movable along said track structure, a second carriage subjacent disposed of said first carriage, means pivotally securing said second carriage from said first carriage, contra-directionally operative means for yieldably arresting the pivotable movement of said second carriage toward or away from said first carriage, dual grinding wheel means including a pair of grinding wheels rotatably mounted from said second carriage, said pair of grinding wheels being of like diameter, justaposedly arranged coaxially and fixedly secured together, said pair of grinding wheels including a first wheel for grinding the right hand spindle and a second wheel for grinding the left hand spindle, an electric motor mounted on said second carriage for driving said pair of grinding wheels, and means for moving said pair of wheels rectilinearly and for moving respectively a first wheel or a second wheel along a respective right hand or left hand spindle securely held respectively in said first or said second clamp means of said dual clamp means.

8. The cotton picker spindle reconditioning machine of claim 7 in which said actuating means includes a hand grip member secured to said electric motor for manually moving rectilinearly said first and said second carriage and a pair of grinding wheels when grinding a right hand or a left hand spindle.

9. A machine for reconditioning cotton picker spindles having at least one longitudinal groove, said machine comprising base means including clamp means mounted on said base means for removably holding one of said spindles with the groove therein disposed upwardly, an upstanding support member mounted on said base means and including horizontally extending track structure, a first carriage supported from and rectilinearly movable along track structure, a second carriage subjacently disposed of said first carriage, means pivotally securing said second carriage from said first carriage, resilient means operably interposed betwen said first and second carriages for yieldably resisting pivoting movement of said second carriage relative to said first carriage, grinding wheel means including a grinding wheel rotatably mounted from said second carriage, motor means for driving said grinding wheel and means for moving said grinding wheel rectilinearly along one of said spindles securely held in said clamp means.

References Cited

UNITED STATES PATENTS

| | | | |
|---|---|---|---|
| 2,397,086 | 3/1946 | Brady | 51—92 |
| 2,740,236 | 4/1956 | Flygare | 51—92 |
| 2,774,191 | 12/1956 | Bouchez | 51—34.2 |
| 2,821,815 | 2/1958 | Banko | 51—34.2 |
| 3,146,551 | 9/1964 | Carlsen | 51—34.2 |

JAMES L. JONES, JR., *Primary Examiner.*